INVENTOR.
Guy F. Gardner

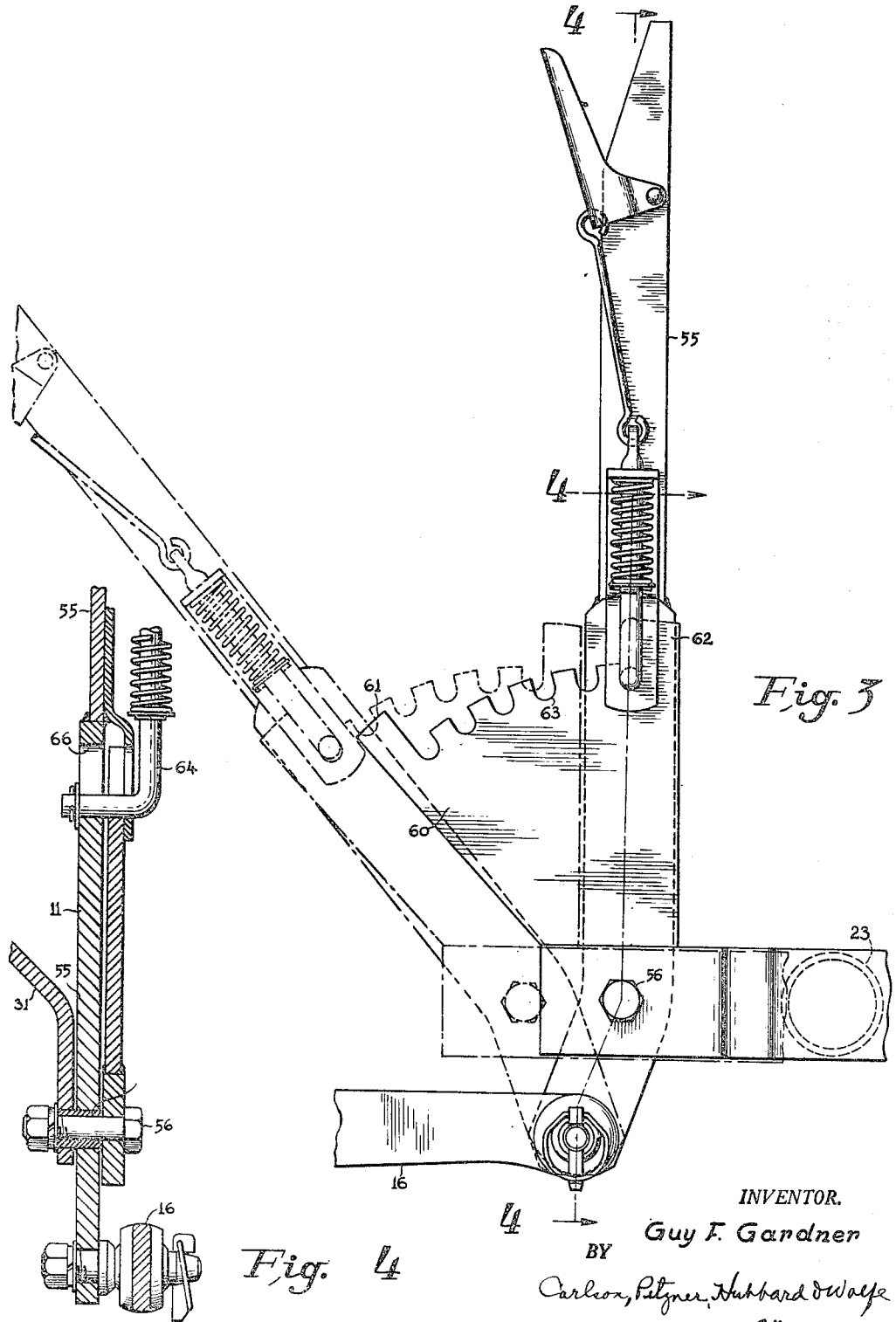

United States Patent Office 2,765,722
Patented Oct. 9, 1956

2,765,722

IMPLEMENT HITCH

Guy F. Gardner, Dearborn, Mich., assignor to Massey-Harris-Ferguson, Inc., Racine, Wis., a corporation of Maryland Application July 30, 1954, Serial No. 446,908

2 Claims. (Cl. 97—47.53)

The present invention relates to an improved hitch for ground engaging implements and more particularly to a hitch mechanism which permits adjustment of the angle of attack of an implement with respect to its line of travel.

Certain agricultural implements require an angling adjustment for most efficient operation and to provide proper tracking behind the tractor. For example, in a moldboard plow it is customary to adjust the lead of the plow to compensate for side thrust on the plow and thereby maintain a direct line of travel of the plow and a straight landside. The same general requirements apply in the case of an offset disc harrow where it is necessary to balance side thrust by adjusting the relative angle of the opposed gangs with respect to the line of travel. For convenience in explaining the invention, the present hitch is described as applied to an offset disc harrow.

It is an object of the present invention to provide an adjustable hitch for a disc harrow or the like which is capable of precise and rapid adjustment under working conditions. It is another object of the invention to provide a hitch which permits adjustment by the tractor operator with the tractor in motion and without leaving the tractor seat and with application of light manual effort. It is a related object to provide means for adjusting the angle of attack of an implement which is not only convenient and readily accessible but which has provision for positive locking so that the adjustment does not change when the device is subjected to a particularly heavy load.

It is a further object to provide an adjustable tractor hitch which may be coupled to the standard hitch linkage of the Ferguson type simply by inserting pins in the three points of connection usually provided and without necessity for any modification, removal, or adjustment of the standard linkage. Because of the latter, coupling is accomplished just as quickly and easily as with implements and hitches not having the present adjustment feature.

It is a related object to provide an adjustable hitch which does not effect the normal operation or geometry of the Ferguson type linkage, or the capabilities of the power lift device associated therewith. It is another object, related to the foregoing to provide a hitch in which the angle of attack may be varied over wide limits without any appreciable tilting of the implement about a longitudinal axis. In one of its aspects, it is an object of the invention to provide a hitch which resists deformation or warping under all conditions of adjustment, even when used with a heavy implement.

It is still another object to provide an adjustable hitch which is durable, inherently strong, and inexpensive to manufacture. While the present hitch is well adapted for use with wide variety of implements requiring adjustment of the angle of attack, it is nevertheless so simple and inexpensive as to permit the hitch to be made as an integral part of the implement without adding appreciably to the cost or weight of the implement.

Other objects and advantages of the invention will become apparent upon reading the attached detailed description taken in connection with the drawings in which;

Figure 3 is a detailed elevation of the adjusting mechanism.

Figure 4 is a vertical section taken along the line 4—4 in Figure 3.

While the invention has been described herein in connection with the preferred embodiment it will be understood that I do not intend to limit the invention to such embodiment but intend to cover all modifications and alternative constructions which may be included within the spirit and scope of the appended claims.

Figure 1:
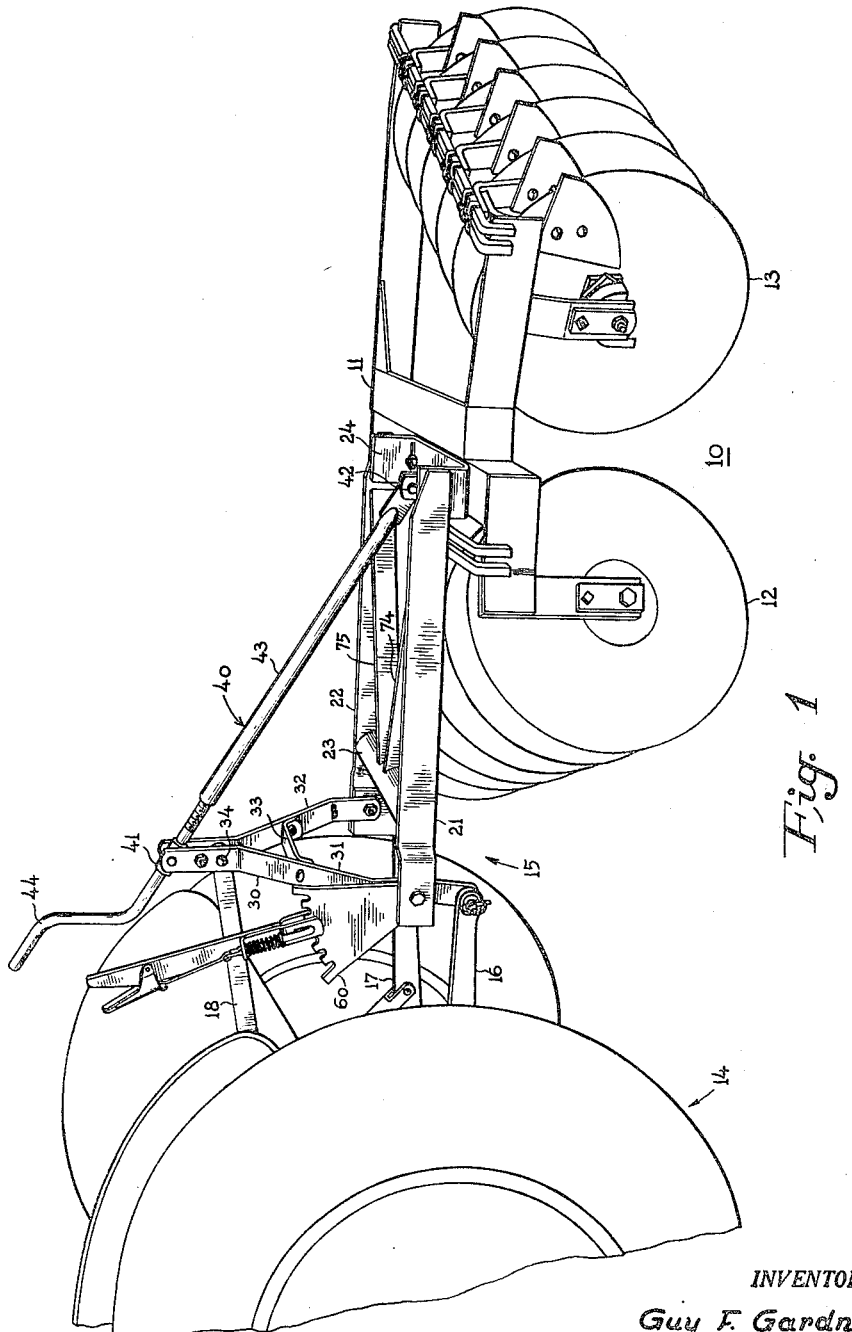
Figure 1 shows a hitch constructed in accordance with the present invention used to couple together an offset disc harrow and a tractor of standard type.

Turning now to the drawings, Figure 1 illustrates the invention as applied to a disc harrow 10 having a frame 11 and gangs 12, 13. The harrow is connected to a tractor 14 by means of the improved hitch which is indicated generally at 15. The tractor, only the rear portion of which is shown, is equipped with a conventional hitch linkage of the Ferguson type, including a pair of rearwardly extending draft links 16, 17 and a top or compression link 18. For the details of the draft linkage and power lift mechanism reference is made to Ferguson U. S. Patent 2,118,180, which issued on May 24, 1938. It will suffice for the present to say that hydraulic lift means are provided within the tractor capable of manually lifting the draft links for automatically controlling the level thereof in response to implement ground reaction transmitted through the upper or compression link 18. With the present hitch in a given position of adjustment, the co-operation between the implement and tractor set forth in the above mentioned patent remains unaffected, by the presence of the adjustable hitch to be described.

Referring again to the drawing, the present hitch 15 includes two side bars 21, 22. These side bars are arranged parallel to one another and are interconnected just rearwardly of their forward ends by a rigid cross member 23. The rear ends of the side bars are interconnected by a U-shaped mounting bracket 24, the upturned ends of which are welded or otherwise secured to the side bars and the horizontal portion of which is bolted securely to the horizontal implement frame 11.

Mounted at the forward end of the hitch ahead of the cross member 23 is an upstanding A frame 30 which is made up of vertical members 31, 32 and a rigidifying cross member 33. The members 31, 32 are spaced apart at their upper ends for reception of the top link 18, being secured to the top link by means of a pin 34.

For the purpose of providing leveling adjustment and for rigidifying the implement with respect to the A frame a rigid strut 40 is provided which is connected to the top end of the A frame by a coupling 41 and which extends rearwardly and downwardly for connection to a tab 42 on the implement mounting bracket 24. In the present instance the strut is made up of an internally threaded tube 43 and a threaded crank 44, the crank being journaled in the coupling 41 for turning by the tractor operator. This enables the entire implement and hitch to be rocked fore and aft with respect to the tractor.

Figure 2:
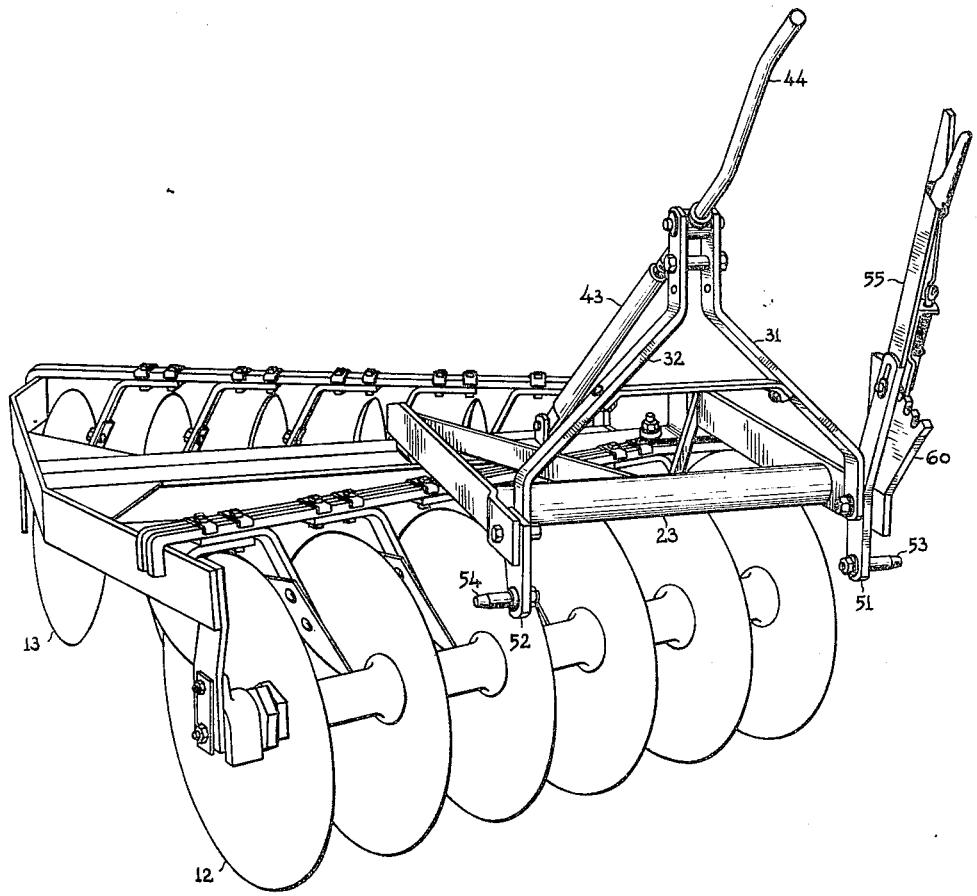
Figure 2 is a perspective showing the hitch and the implement removed from the tractor and as viewed from the front.

For coupling the forward ends of the hitch to the trailing ends of the draft links, downwardly extending brackets 51, 52 (Fig. 2) are provided having rigidly mounted, transversely extending draft or link pins, 53, 54. The link pins during normal operation are held captive in the draft links by use of conventional linch pins.

In accordance with the present invention means are provided for moving the bracket 51 and hence the point of connection of the associated draft link backwardly and forwardly in order to adjust the angle of attack of the implement 10 relative to its path of movement behind the tractor. An upwardly extending control lever is provided in order to enable adjustment by the operator from the tractor seat under normal running conditions and to generate sufficient leverage so that the adjustment may be made with only light manual effort. In carrying out the above the downwardly extending bracket 51 forms an integral part of vertically extending manual lever 55 (Figs. 3 and 4) which is pivoted to the side bar 21 of the hitch by means or a bolt or the like 56. The lever 55 rises approximately to the level of the tractor seat and is accessible for gripping and release by the operator simply by twisting around in the seat while the tractor is under way.

In order to lock the manual lever 55 in a desired position of adjustment, a notched quadrant 60 is provided, having stops 61, 62 and a series of intermediate notches 63. Arranged for engagement with the notches is a spring pressed detent in the form of an L shaped rod 64 which is guided for vertical movement in a bracket 65. The latter is welded or otherwise secured to the lever 55, the lower or bent portion of the rod 64 being passed through a slot 66 formed in the lever. The detent is pressed downwardly by means of the spring 67. For the purpose of raising the detent a grippable release 68 is pivoted to the top end of the manual lever and connected to the detent by a link 69. In order to keep the lever 55 within reach of the operator over its entire range of movement the notched quadrant 60 extends forwardly as shown and the upper portion of the lever 55 is also inclined forwardly relative to the lower end or bracket portion 51 thereof.

Figure 5:
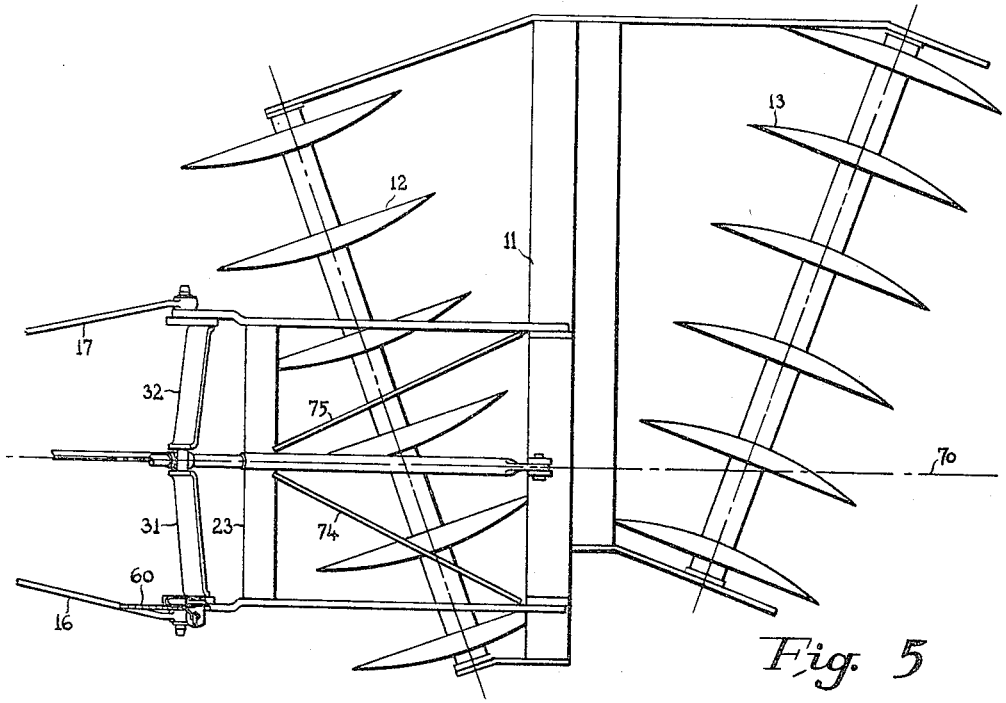
Figures 5 and 6 are top views of the implement and hitch showing the position assumed by the implement in the two extreme positions of adjustment.
Figure 6:
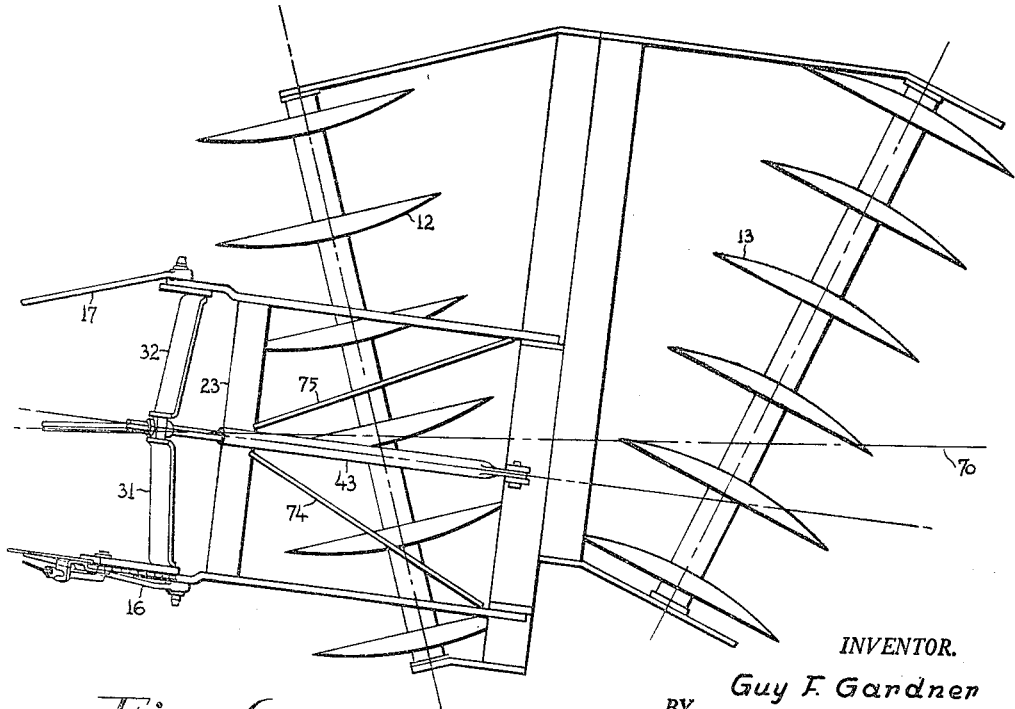

The effect upon the implement of moving the manual lever 55 through its range of movement is illustrated by Figs. 5 and 6. In Fig. 5 the path of travel of the tractor and implement is along the direction of the line 70 and the lever 55 is in its rearmost or vertical position. Under such circumstances the transverse frame 11 of the implement is substantially at right angles to the direction of movement. However, with the lever 55 swung to its full forward position as shown in Fig. 6, and as shown dotted in Fig. 3, the left hand side of the hitch is drawn forwardly toward the tractor so that the hitch and implement frame are skewed in a clockwise direction through an angle A. Preferably the implement is so angled relative to the hitch that moving the manual lever 55 to one extreme will cause crowding action of the implement to the left while movement to the other extreme will cause crowding to the right, the adjustment for proper tracking and operating efficiency being somewhere between the two extremes. One skilled in the art will appreciate that the exact setting cannot be predetermined but is the result of a number of factors including the depth adjustment of the implement, the type of soil, the amount of moisture in the soil and the like.

It has been conventional practice in this country to mount implements such as plows on tool bars having offset or oppositely cranked ends, with the tool bar coupled to the implement frame by means of U bolts or the like. In employing such an arrangement it is necessary to unscrew the nuts on the U bolts by means of a suitable wrench and to apply considerable torque to the tool bar to rotate it around to a new position corresponding to different angling of the implement. Various types of implements have also been equipped for adjustable angling by mounting the implement for rotation about a vertical pivot pin, with the relatively rotatable members fastened together by bolts passing through suitable slots. In both of the above arrangements it is impossible to adjust the direction of the implement under operating conditions and with the tractor in motion. It is necessary to stop the tractor, dismount, and laboriously loosen and readjust the hitch, the process being repeated as many times as necessary to accomplish proper tracking and depending upon the degree of skill of the tractor operator. By contrast, using the present arrangement, the operator simply twists partially around in the tractor seat, grasps the upper end of the adjusting lever 55 which releases the detent, and then moves the lever backwardly or forwardly to a position which will, upon observation, produce the desired tracking and most efficient operation of the implement. The entire adjustment procedure takes a matter of seconds, does not require a skilled operator, and automatically takes into account all of the variable factors alluded to above. In the present embodiment the notched quadrant 60 has a total of six possible positions. It will be apparent to one skilled in the art that additional positions may be provided to enable a finer degree of adjustment for some types of implements.

With the manual lever 55 in its mid-position the bracket 51 which engages the corresponding tractor draft link extends straight down and the draft pins 53 and 54 are in transverse alinement. Movement of the lever through a limited angle on each side of the central position is therefore accompanied by minimum vertical movement of the pin 53 so that for all positions of lever adjustment the pins 53 and 54 are disposed in substantially the same horizontal plane between the hitch and the trailing end of the tractor draft link. In short, moving the bracket 51 and pin 53 through its entire range is accompanied by minimum rocking of the implement about a longitudinal axis and therefore has minimum effect upon the operation of wide implements such as disc harrows. Furthermore, any change in the vertical spacing between the tractor draft link and the hitch which may occur over the range of adjustment has little or no effect upon the hitch structure, any tendency toward warping being effectively resisted by the cross member 23 which is of large tubular construction and firmly welded at its ends to the side bars. If desired, additional bracing may be afforded by braces 74, 75 which are arranged in V formation, being anchored to the center portion of the cross member 23 at their forward ends and being anchored to the rear portion of the side bars 21, 22 at their rear ends (Figs. 5 and 6).

While the present hitch is suitable for use with many types of implements, nevertheless the design lends itself to integral construction in which the adjusting members form a permanent part of the particular implement. This permits the adjustable parts to be tailored to the load imposed by the particular implement and enables a lighter, less expensive construction than would be possible if the adjusting mechanism were required to handle all loads up to the very highest, for example, as imposed by a subsoiler or the like. Attachment of the implement, so equipped, to the tractor is simply effected by inserting three pins just as in the case of a conventional implement. Once connected, the implement cooperates with the tractor linkage and the tractor lift mechanism in the usual fashion to permit depth control and the like just as though the adjusting mechanism were not present. In short, the geometry of the linkage and the power capabilities of the power lift mechanism remain unchanged and fully effective.

I claim as my invention:

1. An implement hitch for a tractor having a pair of laterally spaced draft links of equal length trailingly pivoted at the rear end thereof which comprises, in combination, a frame arranged to span the draft links, said frame providing a pair of spaced connectors at its forward end for engaging the rear end of the draft links, a manually adjustable control lever having its lower end pivoted on one side of the frame and extending vertically so as to be within reach of the operator driving the tractor, one of said connectors being fixed to the frame and the remaining connector being rigidly mounted on the lever adjacent to but vertically spaced from the lever pivot for correspondingly changing its position longitudinally of said frame during pivoting movement of said lever to change the angling of the frame relative to the tractor, said connectors being disposed in substantially the same horizontal plane for all positions of adjustment of said lever, means for normally locking the control lever in a selected position of adjustment and means for releasing the same incident to gripping by the operator.

2. An implement hitch for use with a tractor having a pair of laterally spaced draft links of equal length trailingly pivoted at the rear end thereof comprising, in combination, a frame having a pair of side members and having a torque resisting cross member for maintaining the side members alined with one another, a bracket rigidly mounted at the forward end of one of said members mounting a transverse draft pin for engaging the trailing end of the corresponding draft link, a vertically extending manual lever pivoted to the forward end of the remaining side member for fore and aft rocking movement, said lever carrying a transverse draft pin vertically spaced from said pivot for engaging the trailing end of the remaining draft link, said draft pins being disposed in general transverse alinement when the manual lever occupies a central position and in substantially the same horizontal plane for all positions of adjustment of said lever, and means including a detent arranged for release upon manually gripping the upper end of the lever for locking the lever in a selected position of adjustment.

References Cited in the file of this patent

UNITED STATES PATENTS

| | | |
|---|---|---|
| 1,916,945 | Ferguson | July 4, 1933 |
| 2,609,742 | Love | Sept. 9, 1952 |
| 2,619,019 | Temple et al. | Nov. 25, 1952 |